United States Patent
Yang et al.

(10) Patent No.: US 7,190,788 B2
(45) Date of Patent: Mar. 13, 2007

(54) METHODS AND APPARATUS FOR ENCRYPTING A BINARY STRING

(75) Inventors: Rongzhen Yang, Shanghai (CN); Zheng-Hua Zhou, Shanghai (CN); Michael Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 10/243,275

(22) Filed: Sep. 13, 2002

(65) Prior Publication Data

US 2004/0052367 A1    Mar. 18, 2004

(51) Int. Cl.
*H04L 9/00* (2006.01)
*H04K 1/06* (2006.01)
*H04K 1/00* (2006.01)

(52) U.S. Cl. .............................. 380/42; 380/37; 380/28

(58) Field of Classification Search ................ 380/28, 380/42–44, 37, 263; 708/408, 518, 542, 708/673, 204; 341/82, 83
See application file for complete search history.

(56) References Cited

U.S. PATENT DOCUMENTS

| | | | |
|---|---|---|---|
| 5,077,793 A * | 12/1991 | Falk et al. | 380/28 |
| 5,351,299 A * | 9/1994 | Matsuzaki et al. | 380/37 |
| 2001/0038347 A1 * | 11/2001 | Avery et al. | 341/51 |
| 2002/0094080 A1 * | 7/2002 | Duan et al. | 380/28 |
| 2003/0093446 A1 | 5/2003 | Yang | |

OTHER PUBLICATIONS

R. Yang, Y. Su, X. Fan. "The Varying-Radix Numeration System and Its Application." Acoustics, Speech, and Signal Processing 2001. Proceedings, 2001 IEEE International Conference on, V. 6, 2001. pp. 3953-3956.

* cited by examiner

*Primary Examiner*—Kim Vu
*Assistant Examiner*—Nirav Patel
(74) *Attorney, Agent, or Firm*—Hanley, Flight & Zimmerman LLC

(57) ABSTRACT

The methods and apparatus described herein encrypt an unencrypted binary string using an encryption key and a varying-radix conversion method. The encryption key is used to parse the unencrypted binary string into unencrypted sub-strings. The varying-radix conversion method is used to transform the unencrypted sub-strings into encrypted sub-strings. The encrypted sub-strings may then be concatenated together to produce an encrypted binary string. In addition, the reverse process is employed to recover the unencrypted binary string from the encrypted binary string. For example, the decryption process may occur after the encrypted binary string is transmitted over a network communications system.

17 Claims, 9 Drawing Sheets

METHODS AND APPARATUS FOR ENCRYPTING A BINARY STRING

TECHNICAL FIELD

The present invention relates in general to computing systems and, in particular, to methods and apparatus for encrypting a binary string.

BACKGROUND

Typically, mathematical and engineering systems use a decimal system and/or a binary system to represent numbers and to perform calculations. Over time, alternative numeration systems have been developed for different applications. Such numeration systems include fixed-radix, mixed-radix and mixed-base. A fixed-radix numeration system has a constant radix for all positions of a sequence of digits. In fixed-radix numeration systems, the weights of successive positions are successive integral powers of a single radix, multiplied by the same factor. A mixed-radix numeration system is a radix numeration system in which all radices of each position of a sequence of digits are constant, but not necessarily the same. The mixed-radix numeration system is a more general numeration system in which there may not be integral ratios between the radices of all digits. In a mixed-based numeration system, numbers are represented as the sum of a sequence of position values. Each position consists of a mantissa and a base. The base of a given position is constant for a given application, but the bases across positions are not necessarily integral ratios between the radices of all the positions.

Although the above numeration systems may be used to encrypt data (e.g., prior to transmission over a communication channel), each numeration system has certain disadvantages with respect to transmission efficiency. In addition, encryption systems based on each of the above numeration systems has certain disadvantages with respect to susceptibility to unauthorized deciphering.

DETAILED DESCRIPTION OF EXAMPLES

In general, the methods and apparatus described herein encrypt an unencrypted binary string using an encryption key and a varying-radix conversion method. The encryption key is used to parse the unencrypted binary string into unencrypted sub-strings. The varying-radix conversion method is used to transform the unencrypted sub-strings into encrypted sub-strings. The encrypted sub-strings may then be concatenated together to produce an encrypted binary string. In addition, the reverse process is employed to recover the unencrypted binary string from the encrypted binary string. For example, the decryption process may occur after the encrypted binary string is transmitted over a network communications system.

Figure 1:
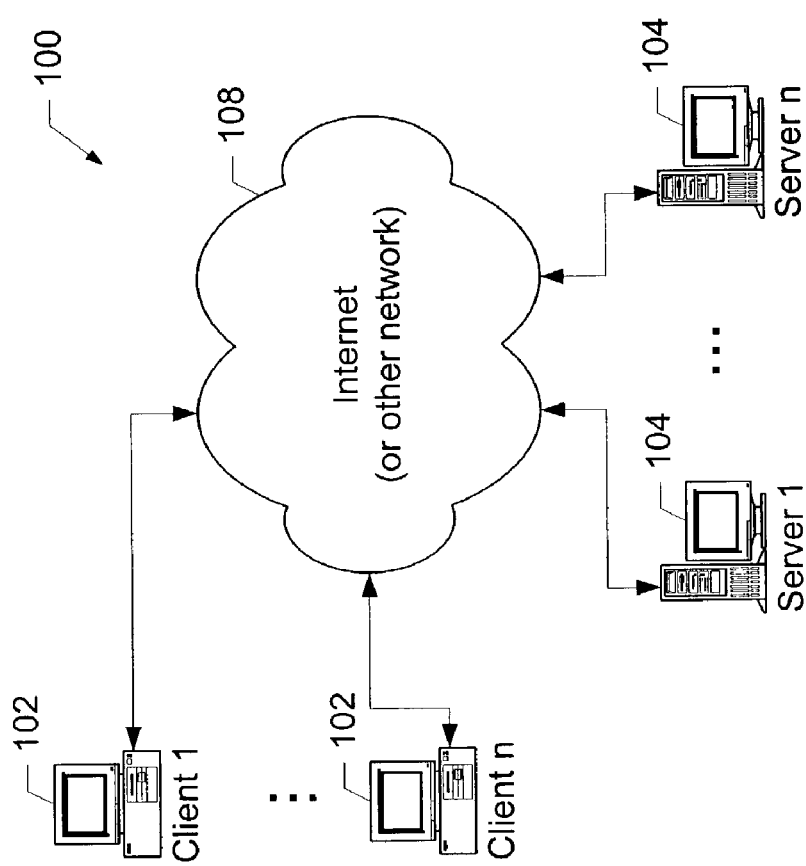
FIG. 1 is a block diagram of an example communications system.

A high level block diagram of an example network communications system 100 is illustrated in FIG. 1. The illustrated system 100 includes one or more client devices 102 and/or one or more servers 104. Each of these devices may communicate with each other via a connection to one or more communications channels 108 such as the Internet or some other network.

Typically, each server 104 stores a plurality of files, programs, and/or web pages for use by the client devices 102 and/or other servers 104. One server 104 may interact with a large number of clients 102 and/or other servers 104. Accordingly, each server 104 is typically a high end computer with a large storage capacity, one or more fast microprocessors, and one or more high speed network connections. Conversely, relative to a typical server 104, each client device 102 typically includes less storage capacity, a single microprocessor, and a single network connection.

Figure 2:
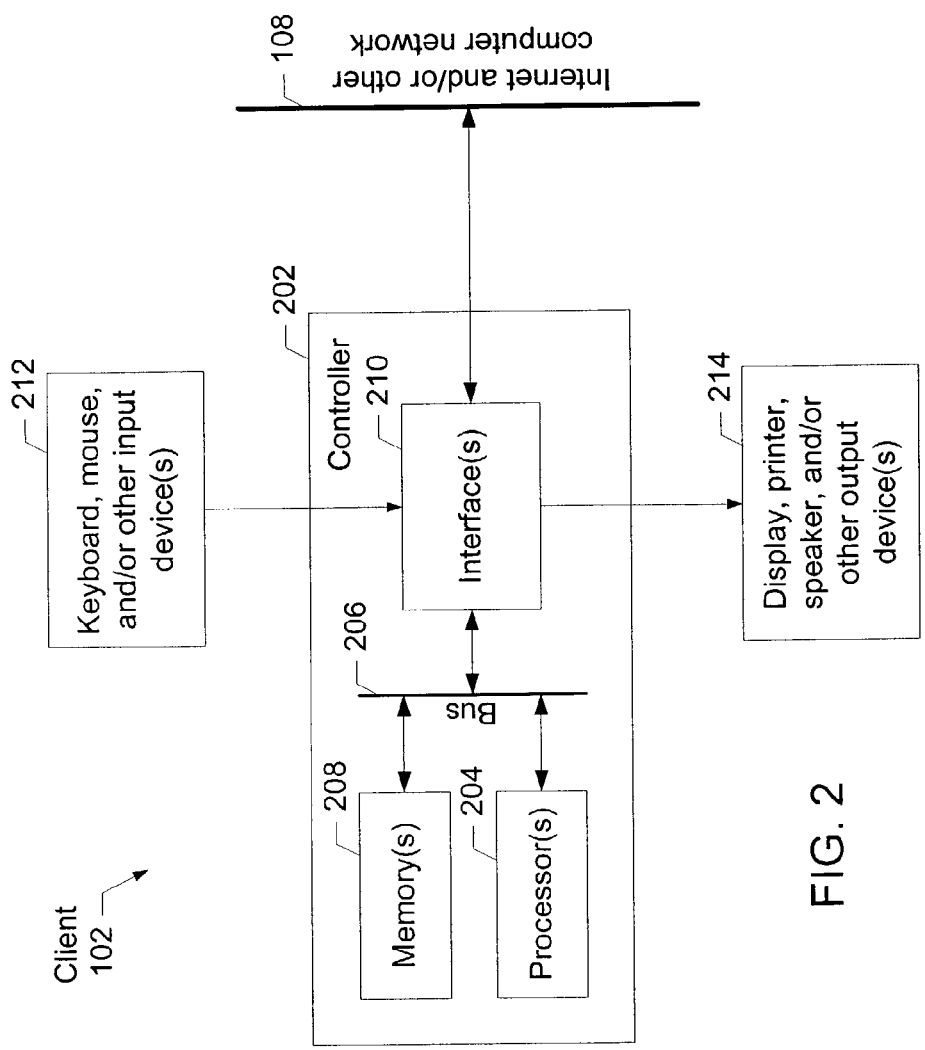
FIG. 2 is a block diagram showing an example client device.

A more detailed block diagram of a client device 102 is illustrated in FIG. 2. The client device may be a personal computer (PC), a personal digital assistant (PDA), an Internet appliance, a cellular telephone, or any other communication device. The client 102 includes a controller 202 which preferably includes a processor 204 electrically coupled by an address/data bus 206 to a memory device 208 and an interface circuit 210. The processor 204 may be any type of well known processor, such as a microprocessor from the Intel Pentium™ family of microprocessors, the Intel Itanium™ family of microprocessors, and/or the Intel XScale™ family of processors. The memory device 208 preferably includes volatile memory and non-volatile memory. Preferably, the memory device 208 stores a software program that interacts with the server 104 and/or another client device 102 as described below. This program may be executed by the processor 204 in a well known manner. The memory device 208 may also store digital data indicative of documents, files, programs, web pages, etc. retrieved from a server 104, another client device 102, and/or loaded via an input device 212.

The interface circuit 210 may be implemented using any type of well known interface standard, such as an Ethernet interface and/or a Universal Serial Bus (USB) interface. One or more input devices 212 are connected to the interface circuit 210 for entering data and commands into the controller 202. For example, the input device 212 may be a keyboard, mouse, touch screen, track pad, track ball, isopoint, and/or a voice recognition system.

One or more displays, printers, speakers, and/or other output devices 214 are also connected to the controller 202 via the interface circuit 210. The display 214 may be a cathode ray tube (CRT), a liquid crystal display (LCD), or any other type of display. The display 214 generates visual displays of data generated or received during operation of the client 102. For example, the display 214 may be used to display web pages received from a server 104 and/or e-mail received from another client device 102. The visual displays may also include prompts for human operator input, run time statistics, calculated values, detected data, etc.

A client 102 may also exchange data with other devices via a connection to the network 108. The network connection may be any type of network connection, such as an Ethernet connection, digital subscriber line (DSL), telephone line, coaxial cable, etc. Users of the system 100 may be required to register with a server 104. In such an instance, each user may choose a user identifier and a password which may be required for the activation of services. The user identifier and password may be passed across the Internet 108 using encryption built into the user's browser, e-mail client, and/or other application(s). Alternatively, the user identifier and/or password may be assigned by a server 104 and/or another client device 102.

Figure 3:
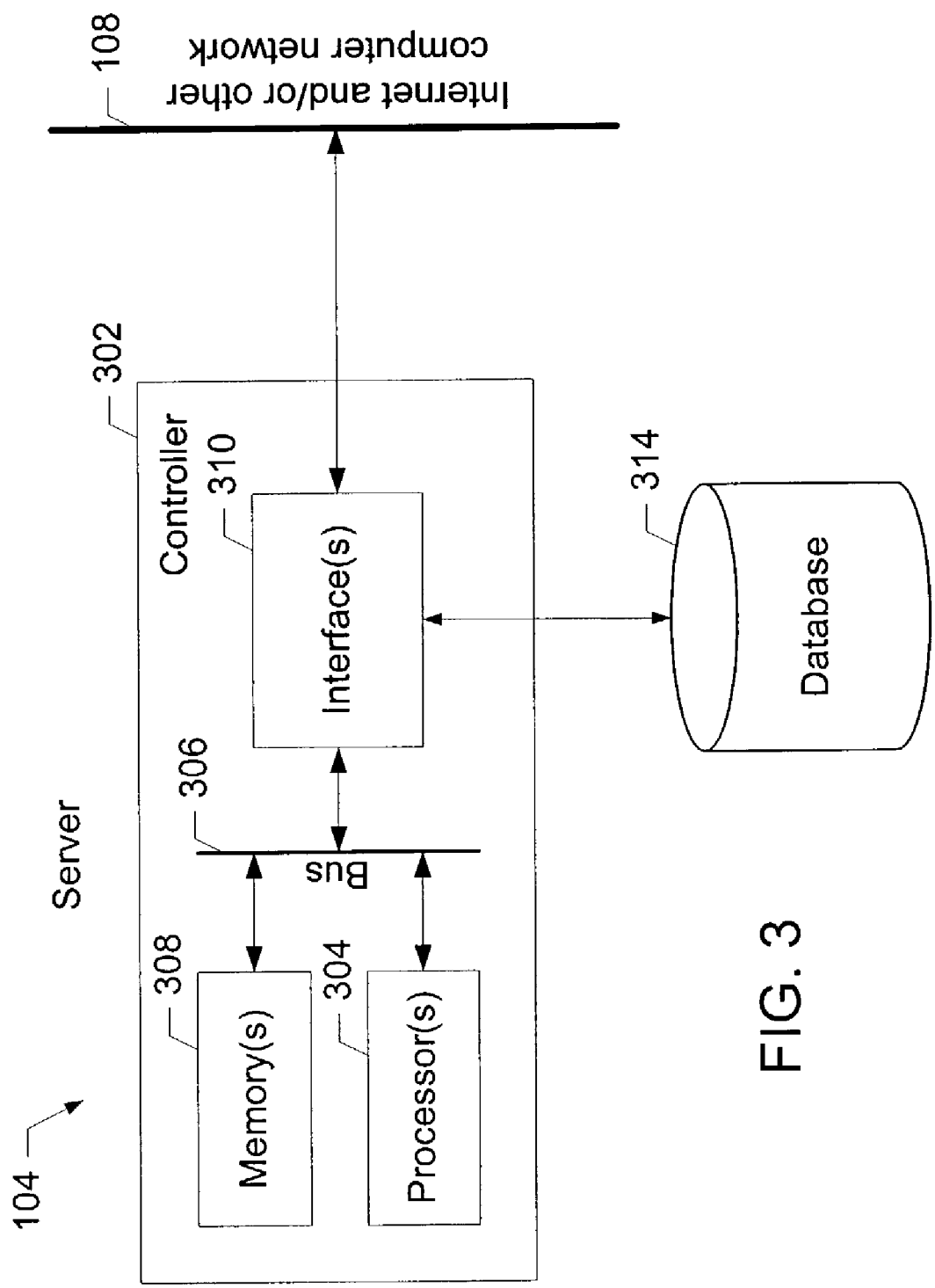
FIG. 3 is a block diagram showing an example server.

A more detailed block diagram of a server 104 is illustrated in FIG. 3. Like the client device 102, the controller 302 in the server 104 preferably includes a processor 304 electrically coupled by an address/data bus 306 to a memory device 308 and a network interface circuit 310. However, the server controller 302 is typically more powerful than the client controller 202. Again, the processor 304 may be any type of well known processor, such as a microprocessor from the Intel Pentium™ family of microprocessors, the Intel Itanium™ family of microprocessors, and/or the Intel XScale™ family of processors. The memory device 308 preferably includes volatile memory and non-volatile memory. Preferably, the memory device 308 stores a software program that implements all or part of the method described below. This program may be executed by the processor 304 in a well known manner. However, some of the steps described in the method below may be performed manually or without the use of the server 104. The memory device 308 and/or a separate database 314 also store files, programs, web pages, etc. for use by other servers 104 and/or the client devices 102.

The server 104 exchanges data with other devices via a connection to the network 108. The network interface circuit 310 may be implemented using any data transceiver, such as an Ethernet transceiver. The network 108 may be any type of network, such as a local area network (LAN) and/or the Internet. In one example, a server 104 and/or a client device 102 encrypt data using a varying-radix sequence prior to transmission over the network 108. In another example, a server 104 and/or a client device 102 decrypt data using a varying-radix sequence after transmission over the network 108. The encrypted data may represent anything, such as text, pictures, video, money, blueprints, inventory, personal records, etc.

Figure 4:
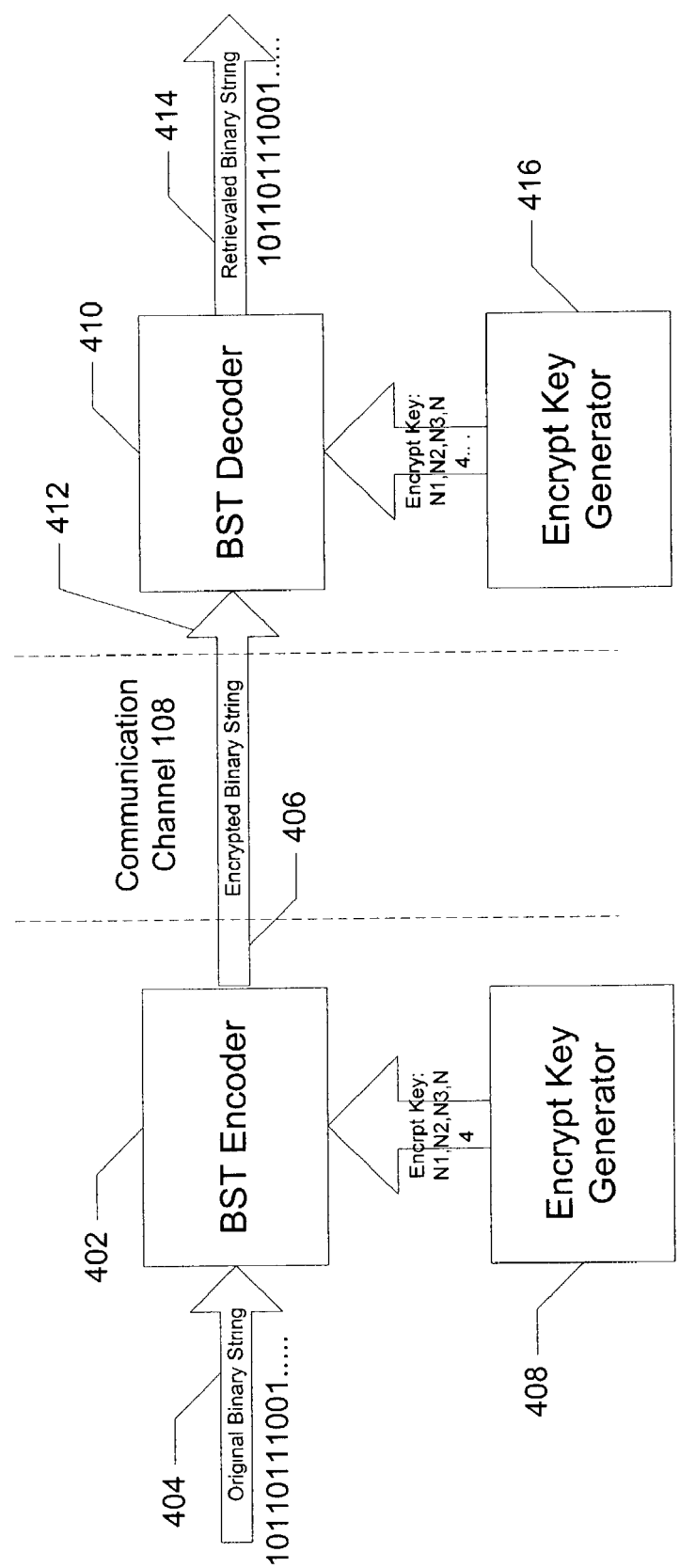
FIG. 4 is a block diagram showing the example communications system of FIG. 1 in greater detail.

The example communications system 100 is shown in greater detail in FIG. 4. A binary string transform (BST) encoder 402 includes an input port 404 and an output port 406. The input port 404 supplies the BST encoder 402 with an unencrypted binary string. The output port 406 transmits an encrypted version of the binary string over the network 108 or any communication channel.

The BST encoder 402 is also connected to an encryption key generator 408. The encryption key generator 408 supplies the BST encoder 402 with an encryption key used in conjunction with the process described in detail below to convert the unencrypted binary string into the encrypted binary string. The BST encoder 402 and/or the encryption key generator 408 may be implemented in hardware and/or software. In one example, the BST encoder 402 and/or the encryption key generator 408 are implemented by a client 102 and/or a server 104.

On the receiving end, a binary string transform (BST) decoder 410 includes an input port 412 and an output port 414. The input port 412 supplies the BST decoder 410 with an encrypted binary string. The output port 414 transmits an unencrypted version of the binary string to any receiving device.

The BST decoder 410 is also connected to an encryption key generator 416. The encryption key generator 416 supplies the BST decoder 410 with the same encryption key used by the transmitting encryption key generator 408. The encryption key is used in conjunction with the process described in detail below to convert the encrypted binary string into the unencrypted binary string. The BST decoder 410 and/or the encryption key generator 416 may be implemented in hardware and/or software. In an example, the BST decoder 410 and/or the encryption key generator 416 are implemented by a client 102 and/or a server 104.

Figure 5:
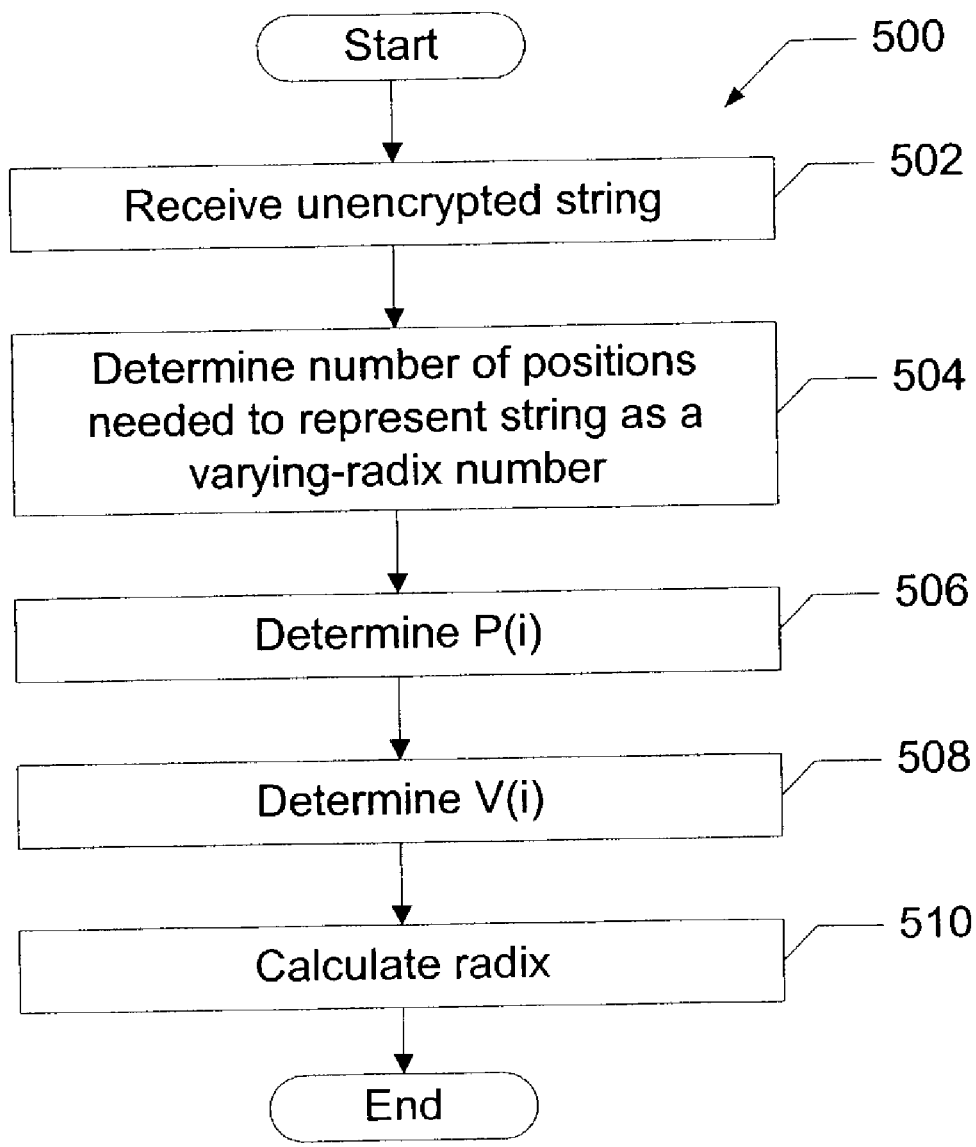
FIG. 5 is a flowchart of a process for generating a varying-radix sequence.

A flowchart of a process 500 for generating a varying-radix sequence is illustrated in FIG. 5. Preferably, the process 500 is embodied in a software program which is stored in a memory device and executed by a processor in a well known manner. However, some or all of the steps of the process 500 may be performed manually. Although the process 500 is described with reference to the flowchart illustrated in FIG. 5, a person of ordinary skill in the art will readily appreciate that many other methods of performing the acts associated with process 500 may be used. For example, the order of many of the steps may be changed. In addition, many of the steps described are optional.

At block 502, a controller 202, 302 receives a first sequence. At block 504, the controller 202, 302 determines the number of positions of a second sequence for representing the first sequence. If the controller 202, 302 determines that k+1 positions are necessary to represent the first sequence, then the second sequence can be described as the following: v(k) v(k−1) v(k−2) . . . v(i) . . . v(1). For the $i^{th}$ position of the sequence, v(i) is the value. The v(0) value is not shown in the sequence because it can be calculated from equation 1 as follows:

$$v(0) = p(0) - \sum_{i=1}^{k} v(i) \quad (1)$$

At block 506, the controller 202, 302 optionally determines an application value from the function p(i). The function p(i) is based on a set of rules derived for an application or set of applications. In an example, the function p(i) is a constant value dependent on the application. In another example, the function p(i) defines the maximum radix of the second sequence.

At block 508, the controller 202, 302 determines v(i) for each position of the second sequence. At block 510, the controller 202, 302 calculates the radix for each position, designated by o(i), of the second sequence in accordance with equation 2 as follows:

$$o(i) = p(i) + 1 - \sum_{j=i+1}^{k} v(j) \quad i = 1 \ldots k \quad (2)$$

The second sequence is a varying-radix sequence in which the radix of each position of the second sequence varies according to the value expressed by the second sequence.

In order to use the above principles to encrypt a binary string, the binary string may be parsed into sub-strings according to an encryption key, analyzed for encoding, and then the binary string may be encoded. Parsing the unencrypted binary string into sub-strings according to the encryption key breaks the binary string into variable length segments for encoding. For example, if the unencrypted binary string is "10101011001010" and the decimal encryption key is "3425," then the first sub-string is "101," the second sub-string is "0101," the third sub-string is "10," and the fourth sub-string is "01010." If the encryption key remains unknown to unauthorized users, the length of the sub-strings remains unknown to unauthorized users.

Figure 6:
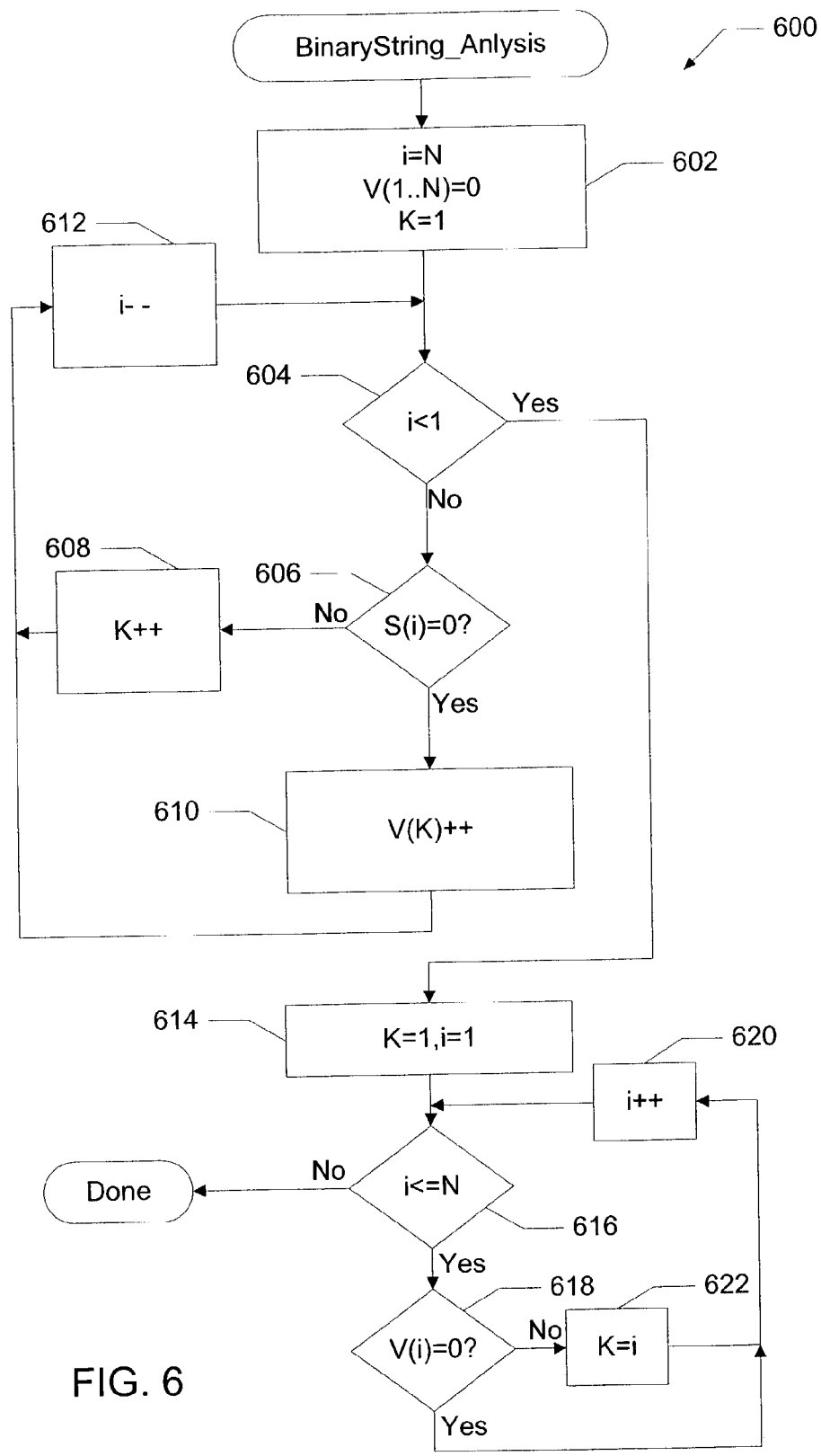
FIG. 6 is a flowchart of a binary string analysis process.

One example of a binary string analysis process 600 is illustrated in FIG. 6. The binary string analysis process 600 takes two inputs and generates two outputs. The two inputs are a binary string "S(i)" to be analyzed (e.g., "101") and the length of that binary string "N" (e.g., 3). The two outputs are a "number of zeros" array "V(j)" (i.e., a varying radix number) and a "highest location" variable "K".

The binary string analysis process 600 begins by causing the transmitting controller 202, 302 to initialize several variables (block 602). In the example illustrated in FIG. 6, an index variable "i" is set equal to the current sub-string length "N" (e.g., 3). In addition, the "number of zeros" array "V(j)" is initialized to all zeros (e.g., V(1)=0; V(2)=0; and V(3)=0). The "highest location" variable "K" is initialized to "1".

Each time through a first loop in the string analysis process 600, the index variable "i" is tested to see if "i" is less than "1" (block 604). If "i" is not less than "1", the transmitting controller 202, 302 tests the binary string "S( )" being analyzed (e.g., "101") to see if the bit of the binary string pointed to by the index variable "i" is equal to zero (block 606). If the bit of the binary string "S(i)" pointed to by the index variable "i" is not equal to zero, the transmitting controller increments the "highest location" variable "K" by one (block 608). However, if the bit of the binary string "S(i)" pointed to by the index variable "i" is equal to zero, the transmitting controller increments the element "V(K)" of the "number of zeros" array "V( )" pointed to by the "highest location" variable "K" by one (block 610). In either event, the transmitting controller 202, 302 decrements the index variable "i" by one (block 612) and loops back to block 604. This first loop is repeated until "i" is decremented to zero.

When "i" is decremented to zero, block 604 determines that "i" is less than "1", and the transmitting controller 202, 302 advances to a second loop in the binary string analysis process 600. In the second loop, the binary string analysis process 600 causes the transmitting controller 202, 302 to reinitialize some variables (block 614). In the example illustrated in FIG. 6, the index variable "i" and the "highest location" variable "K" are both reinitialized to "1".

Each time through the second loop in the string analysis process 600 as illustrated in FIG. 6, the index variable "i" is tested to see if "i" is still less than or equal to the current sub-string length "N" (e.g., 3) (block 616). If "i" is less than or equal to the current sub-string length "N", the transmitting controller 202, 302 tests the element of the "number of zeros" array "V( )" pointed to by "i" to see if that element "V(i)" is equal to zero (block 618). If the "number of zeros" element "V(i)" is equal to zero, the index variable "i" is incremented by one (block 620). However, if the "number of zeros" element "V(i)" is not equal to zero, the "highest location" variable "K" is set equal to the index variable "i" (block 622) and the index variable "i" is incremented by one (block 620). If at block 616 "i" is not less than or equal to the current sub-string length "N", the transmitting controller 202, 302 exits the binary string analysis process 600.

Once the transmitting controller 202, 302 completes the binary string analysis process 600, the transmitting controller 202, 302 preferably begins a binary string encoding process 700. The example binary string encoding process 700 illustrated in FIG. 7 takes three inputs and generates one output. The three inputs are the "number of zeros" array "V(j)" generated by the binary string analysis process 600, the "highest location" variable "K" generated by the binary string analysis process 600, and the length of the binary string "N" (e.g., 3). The output is an encrypted version of the binary string "S(i)" used by the binary string analysis process 600.

Figure 7:
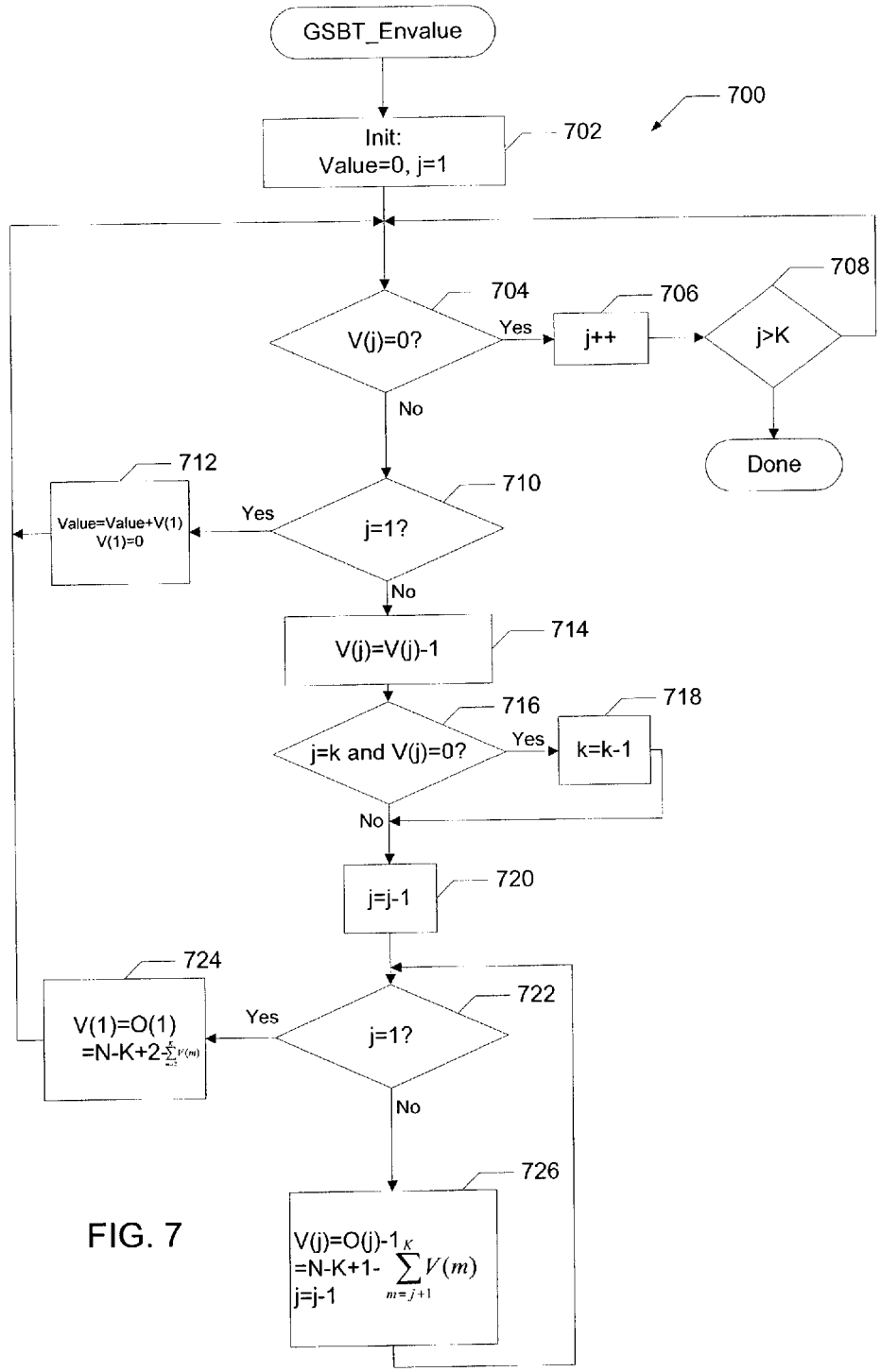
FIG. 7 is a flowchart of a binary string encoding process.

The binary string encoding process 700 of FIG. 7 begins by causing the transmitting controller 202, 302 to initialize two variables (block 702). In the example illustrated in FIG. 7, an index variable "j" is set equal to one, and a "encoded value" variable "Value" is initialized to zero. Next, the transmitting controller 202, 302 tests the element of the "number of zeros" array "V( )" pointed to by "j" to see if that element "V(j)" is equal to zero (block 704). If the "number of zeros" element "V(j)" is equal to zero, the index variable "j" is incremented by one (block 706), and the index variable "j" is tested to determine if the index variable "j" is greater than the "highest location" variable "K" (block 708), which was generated by the binary string analysis process 600. If the index variable "j" is greater than the "highest location" variable "K", the binary string encoding process 700 terminates, and the current value of the variable "Value" (e.g., "100") is the encoded version of the binary string "S(i)".

However, if the index variable "j" is not greater than the "highest location" variable "K", the transmitting controller 202, 302 tests the next element of the "number of zeros" array "V( )" pointed to by "j" (now that j has been incremented by block 706) to see if that element "V(j)" is equal to zero (block 704). If the "number of zeros" element "V(j)" is not equal to zero, the index variable "j" is tested to determine if the index variable "j" is equal to one (block 710). If the index variable "j" is equal to one, the first element V(1) of the "number of zeros" array is added to the current value of the variable "Value", and the first element V(1) of the "number of zeros" array is set equal to zero (block 712). However, if the index variable "j" is not equal to one, the element "V(j)" of the "number of zeros" array "V( )" which is pointed to by "j" is decremented by one (block 714).

Subsequently, the index variable "j" and the element "V(j)" of the "number of zeros" array "V( )" are tested (block 716). If the index variable "j" is equal to the "highest location" variable "K" (which was generated by the binary string analysis process 600) and the element "V(j)" of the "number of zeros" array "V( )" is equal to zero, then the "highest location" variable "K" is decremented by one (block 718) and the index variable "j" is decremented by one (block 720). However, if the index variable "j" is not equal to the "highest location" variable "K" or the element "V(j)" of the "number of zeros" array "V( )" is not equal to zero, then the index variable "j" is decremented by one (block 720), but the "highest location" variable "K" is not decremented by one.

Again, the index variable "j" is tested to determine if the index variable "j" is equal to one (block 722). If the index variable "j" is equal to one, the first element V(1) of the "number of zeros" array is set equal to a new value based on the predetermined formula shown in FIG. 7 (block 724). Subsequently, the transmitting controller 202, 302 tests the element "V(j)" of the "number of zeros" array to see if that element is equal to zero (block 704), and the binary string encoding process 700 continues as described above. However, if the index variable "j" is not equal to one, the element V(j) of the "number of zeros" array is set equal to a new value based on another predetermined formula (as shown in FIG. 700) and the index variable "j" is decremented by one (block 726). In such an instance, control returns to block 722, and the binary string encoding process 700 continues as described above.

Once the transmitting controller 202, 302 completes the binary string encoding process 700, the encoded version of the binary string "S(i)" (e.g., "Value"="100") may be transmitted via the network 108 to a receiving controller 202, 302 in a well known manner. Once the encoded version of the binary string "S(i)" (i.e., "Value") is received, the receiving controller 202, 302 preferably begins a varying radix generation process 800. The example varying radix generation process 800 illustrated in FIG. 8 takes two inputs and generates one output. The two inputs are the encoded version of the binary string "S(i)" (referred to in the following as "Value") and the length of the binary string "N" (e.g., 3). The output is the "number of zeros" array "V(j)" (i.e., the varying radix number).

Figure 8:
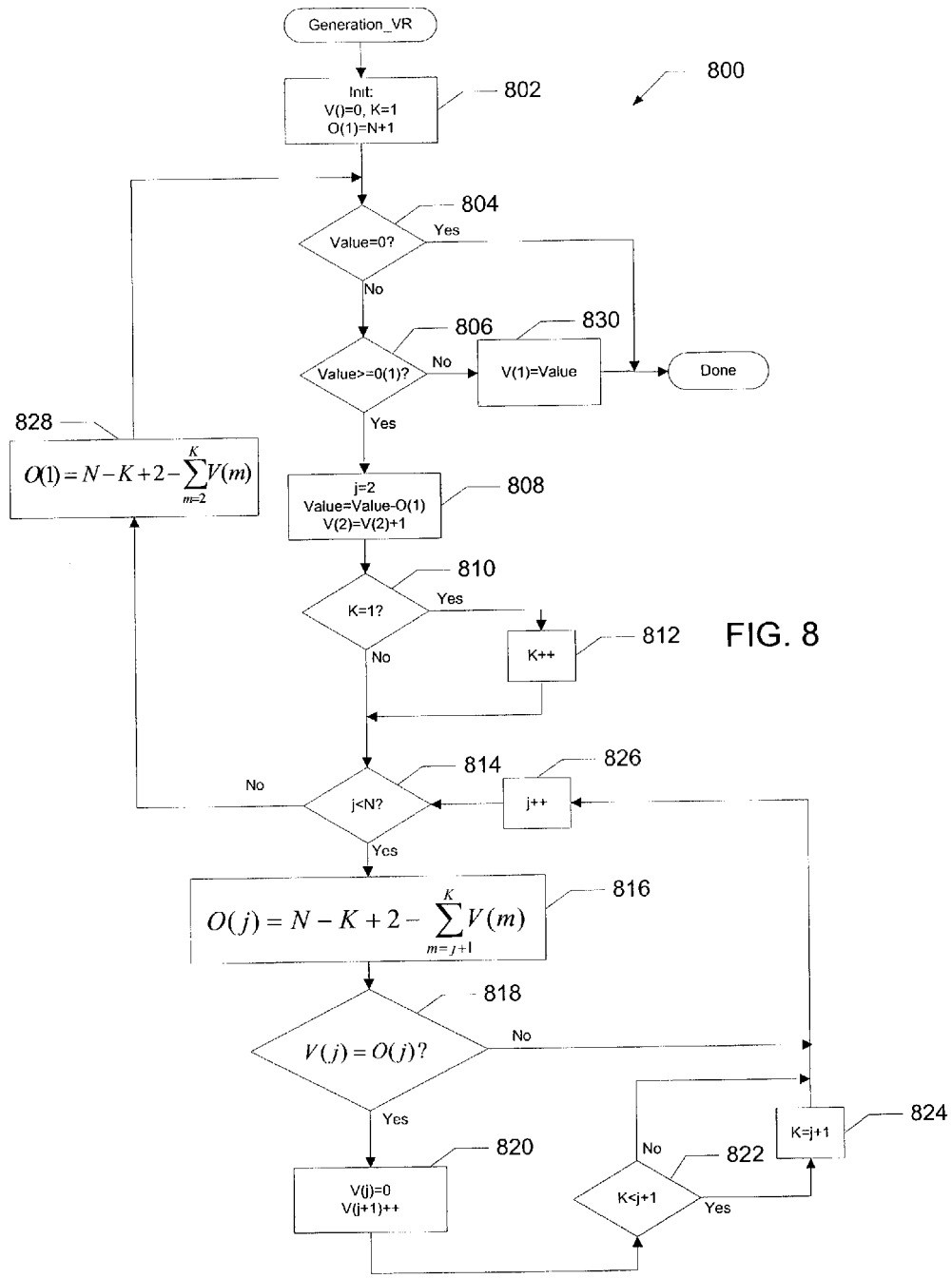
FIG. 8 is a flowchart of a varying radix generation process.

The varying radix generation process 800 of FIG. 8 begins by causing the receiving controller 202, 302 to initialize several variables (block 802). In the example illustrated in FIG. 8, the "number of zeros" array "V(j)" (i.e., the varying-radix number) is initialized to all zeros (e.g., V(1)=0; V(2)=0; and V(3)=0). The "highest location" variable "K" is initialized to "1". And, the first element "O(1)" of a radix array "O( )" (i.e., the value of each of the varying radixes) is initialized to the length of the binary string "N" plus one (e.g., 3+1=4).

Next, the receiving controller 202, 302 tests "Value" to see if "Value" is equal to zero (block 804). If "Value" is not equal to zero, the receiving controller 202, 302 tests "Value" to see if "Value" is greater than or equal to the first element "O(1)" of the radix array "O( )" (block 806). If "Value" is greater than or equal to the first element "O(1)" of the radix array "O( )", an index variable "j" is set equal to two, "Value" is decremented by the value of the first element "O(1)" of the radix array, and the second element "V(2)" of the "number of zeros" array "V( )" is incremented by one (block 808). Subsequently, the "highest location" variable "K" is tested to determine if "K" is equal to one (block 810). If the "highest location" variable "K" is equal to one, "K" is incremented by one (block 812).

Next, the receiving controller 202, 302 tests the index variable "j" to determine if "j" is less than the length of the binary string "N" (block 814). If the index variable "j" is less than the length of the binary string "N", the jth element O(j) of the radix array "O( )" is set equal to a new value based on the predetermined formula shown in FIG. 8 (block 816). Subsequently, the receiving controller 202, 302 tests the element "V(j)" of the "number of zeros". array to see if that element is equal the element "O(j)" of the radix array (block 818). If "V(j)" is equal to "O(j)", "V(j)" is set equal to zero and "V(j+1)" is incremented by one (block 820). In addition, the "highest location" variable "K" is tested to determine if "K" is less than the index variable "j+1" (block 822). If "K" is less then "j+1", "K" is set equal to "j+1" (block 824).

Regardless of the outcome of the test at block 818, the receiving controller 202, 302 increments index variable "j" by one (block 826), and retests "j" to determine if "j" is less than the length of the binary string "N" (block 814). If "j" is not less than "N", the first element O(1) of the radix array "O( )" is set equal to a new value based on the predetermined formula shown in FIG. 8 (block 828).

Again, the receiving controller 202, 302 tests "Value" to see if "Value" is equal to zero (block 804). If "Value" is equal to zero, the varying radix generation process 800 terminates, and the current value of the "number of zeros" array "V(j)" is the recovered varying radix number. If "Value" is not equal to zero, the receiving controller 202, 302 tests "Value" to see if "Value" is greater than or equal to the first element "O(1)" of the radix array "O( )" (block 806). If "Value" is not greater than or equal to the first element "O(1)" of the radix array "O( )", the first element "V(1)" of the "number of zeros" array "V( )" is set equal to "Value" (block 830), and the varying radix generation process 800 terminates with the current value of the "number of zeros" array "V(j)" being the recovered varying radix number.

Once the receiving controller 202, 302 completes the varying radix generation process 800, the receiving controller 202, 302 preferably begins a binary string reconstruction process 900. The example binary string reconstruction process 900 illustrated in FIG. 9 takes two inputs and generates one output. The two inputs are the "number of zeros" array "V(j)" (i.e., the recovered varying radix number) and the length of the binary string "N". The output is a decoded version of the encoded binary string "S(i)" (i.e., the recovered binary string "S(i)").

Figure 9:
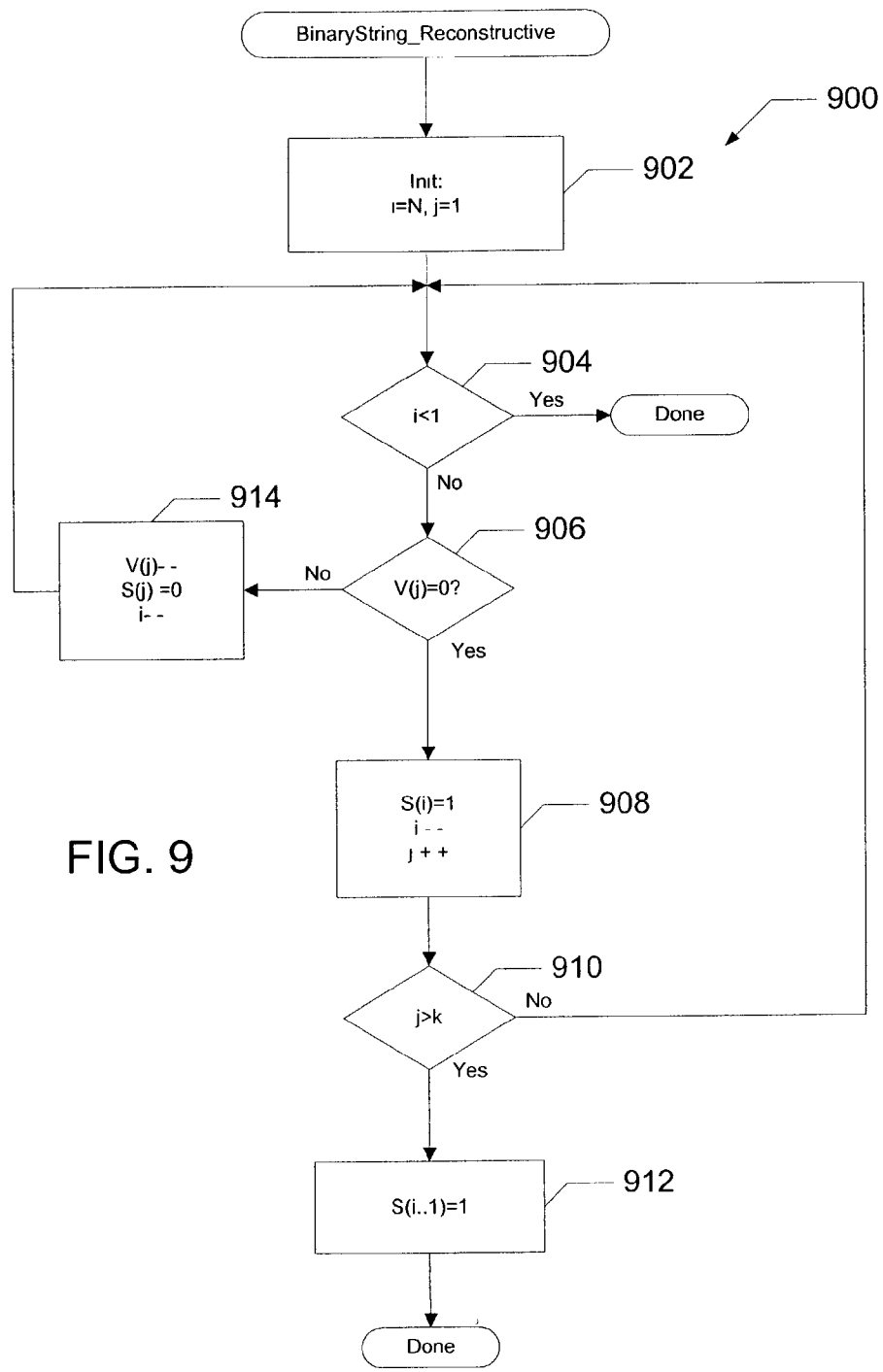
FIG. 9 is a flowchart of a binary string reconstruction process.

The binary string reconstruction process 900 of FIG. 9 begins by causing the receiving controller 202, 302 to initialize two variables (block 902). In the example illustrated in FIG. 9, an index variable "i" is set equal to the length of the binary string "N", and an index variable "j" is initialized to one.

After initialization, the receiving controller 202, 302 tests the index variable "i" to determine if the index variable "i" is less than one (block 904). If the index variable "i" is not less than one, the jth element "V(j)" of the "number of zeros" array "V( )" is tested to determine if "V(j)" is equal to zero (block 906). If "V(j)" is equal to zero, the element of the binary string "S( )" pointed to by the index variable "i" is set equal to one, the index variable "i" is decremented by one, and the index variable "j" is incremented by one (block 908). Subsequently, the index variable "j" is tested to determine if "j" is greater than the "highest location" variable "K" (block 910). If "j" is greater than the "highest location" variable "K", all of the elements of the binary string "S( )" from the element pointed to by "i" to the first element "S(i)" are set equal to one (block 912), and the binary string reconstruction process 900 terminates with the current value of "S( )" being the decoded binary string.

However, if the "j" is not greater than the "highest location" variable "K", the receiving controller retests the index variable "i" to determine if the index variable "i" is less than one (block 904). If the index variable "i" is not less than one, the jth element "V(j)" of the "number of zeros" array "V( )" is tested to determine if "V(j)" is equal to zero (block 906). If "V( )" is not equal to zero (block 906), the element of the "number of zeros" array "V(j)" is decremented by one, the element of the binary string "S(j)" is set equal to zero, and the index variable "i" is decremented by one (block 914). Again, the index variable "i" is tested to determine if the index variable "i" is less than one (block 904). If the index variable "i" is less than one (block 904), the binary string reconstruction process 900 terminates with the current value of "S( )" being the decoded binary string.

In summary, persons of ordinary skill in the art will readily appreciate that a method and apparatus for encrypting a binary string has been provided. The foregoing description has been presented for the purposes of illustration and description. It is not intended to be exhaustive or to limit this patent to the examples disclosed. Many modifications and variations are possible in light of the above teachings. It is intended that the scope of the invention be limited not by this detailed description of examples, but rather by the claims appended hereto.

What is claimed is:

1. A method of encrypting a binary string, the method comprising;
receiving the binary string;
receiving an encryption key, the encryption key including a first integer and a second integer;
parsing the binary string into a first sub-string and a second sub-string, the first sub-string having a first number of binary bits, the second sub-string having a second number of binary bits, the first number of binary bits being equal to the first integer of the encryption key, the second number of binary bits being equal to the second integer of the encryption key;
determining a first varying-radix number based on the first sub-string; and
determining a first encrypted value for the first sub-string based on the first varying-radix number.

2. A method as defined in claim 1, further comprising:
determining a second varying-radix number based on the second sub-string;
determining a second encrypted value for the second sub-string based on the second varying-radix number; and
concatenating the first encrypted value with the second encrypted value to create an encrypted string.

3. A method as defined in claim 2, further comprising transmitting the encrypted string to a computing device storing a copy of the encryption key, wherein determining the first encrypted value is further based on a highest location value.

4. A method as defined in claim 1, further comprising determining a highest location value associated with the first varying-radix number, wherein determining the first encrypted value is further based on the highest location value.

5. A method of decrypting an encrypted binary string, the method comprising:
using an encryption key, the encryption key including a first integer and a second integer;
receiving the encrypted binary string;
parsing the encrypted binary string into a first sub-string and a second sub-string, the first sub-string having a first number of binary bits, the second sub-string having a second number of binary bits, the first number of binary bits being equal to the first integer of the encryption key, the second number of binary bits being equal to the second integer of the encryption key, the first sub-string representing a first varying-radix number, the second sub-string representing a second varying-radix number; and
converting the first varying-radix number into a first unencrypted binary string.

6. A method as defined in claim 5, further comprising:
converting the second varying-radix number into a second unencrypted binary string; and
concatenating the first unencrypted binary string with the second unencrypted binary string.

7. An encryption device comprising:
an input port;
an output port;
an encryption key generator; and
a binary string transform (BST) encoder operatively coupled to the input port, the output port, and the encryption key generator, the BST encoder being structured to receive a binary string from the input port, the BST encoder being structured to receive an encryption key from the encryption key generator, the BST encoder being structured to determine a varying-radix number based on the binary string and the encryption key, the BST encoder being structured to transmit the varying-radix number to the output port.

8. An encryption device as defined in claim 7, wherein the BST encoder is further structured to determine a highest location value associated with the varying-radix number.

9. A decryption device comprising:
an input port;
an output port;
an encryption key generator; and
a binary string transform (BST) decoder operatively coupled to the input port, the output port, and the encryption key generator, the BST decoder being structured to receive an encrypted binary string from the input port, the BST decoder being structured to receive an encryption key from the encryption key generator, the BST decoder being structured to determine a varying-radix number based on the encrypted binary string and the encryption key.

10. A decryption device as defined in claim 9, wherein the BST decoder is further structured to determine an unencrypted binary string from the varying-radix number.

11. A decryption device as defined in claim 10, wherein the BST decoder is further structured to transmit the unencrypted binary string to the output port.

12. A machine readable medium storing digital information, the digital information being structured to cause a hardware device to:
parse a binary string into a first sub-string and a second sub-string, the first sub-string having a first number of binary bits, the second sub-string having a second number of binary bits, the first number of binary bits being equal to a first integer of an encryption key, the second number of binary bits being equal to a second integer of the encryption key;
determine a first varying-radix number based on the first sub-string; and
determine a first encrypted value for the first sub-string based on the first varying-radix number.

13. A machine readable medium as defined in claim 12, wherein the digital information is further structured to cause the hardware device to:
determine a second varying-radix number based on the second sub-string;
determine a second encrypted value for the second sub-string based on the second varying-radix number; and
concatenate the first encrypted value with the second encrypted value to create an encrypted string.

14. A machine readable medium as defined in claim 13, wherein the digital information is further structured to cause the hardware device to transmit the encrypted string to a computing device which is storing a copy of the encryption key.

15. A machine readable medium as defined in claim 12, wherein the digital information is further structured to cause the hardware device to determine a highest location value associated with the first varying-radix number, wherein determining the first encrypted value is also based on the highest location value.

16. A machine readable medium storing digital information, the digital information being structured to cause a hardware device to:

parse an encrypted binary string into a first sub-string and a second sub-string, the first sub-string having a first number of binary bits, the second sub-string having a second number of binary bits, the first number of binary bits being equal to a first integer of an encryption key, the second number of binary bits being equal to a second integer of the encryption key, the first sub-string representing a first varying-radix number, the second sub-string representing a second varying-radix number; and convert the first varying-radix number into a first unencrypted binary string.

17. A machine readable medium as defined in claim 16, wherein the digital information is further structured to cause the hardware device to:

convert the second varying-radix number into a second unencrypted binary string; and concatenate the first unencrypted binary string with the second unencrypted binary string.

* * * * *